Patented June 4, 1946

2,401,685

UNITED STATES PATENT OFFICE 2,401,685

STABILIZATION OF ZEIN WITH ETHYLENE OXIDE

Hugh J. Hagemeyer, Jr., Kingsport, Tenn., assignor to Eastman Kodak Company, Rochester, N. Y., a corporation of New Jersey No Drawing. Application March 18, 1944, Serial No. 527,144

3 Claims. (Cl. 106—153)

This invention relates to the stabilization of solutions of zein such as an aqueous acetone or aqueous alcohol by incorporating therein a small proportion of ethylene oxide.

Zein, the protein derived from corn, is unique among the commercially available proteins by virtue of the fact that it is soluble in many organic solvents. This makes it especially valuable for many purposes. In spite of the desirable properties of zein and the large amount which is commercially available, that protein has never found wide application. This is thought to be due to the fact that zein solutions gradually increase in viscosity until a gel is formed. This change usually takes place within 24 to 48 hours and therefore, unless the solution is to be employed within a short time, it becomes unsuitable for use. In most cases the zein solutions are filtered and also there may be various other processing steps before use such as mixing with added ingredients. By the time these operations are complete, the zein often has begun to gel and the solutions are of no value.

One object of my invention is to provide a method of reducing the tendency of zein solutions to gel so as to make possible their storage for as much as 5 to 10 days without undergoing an appreciable change in viscosity. Other objects of my invention will appear herein.

I have found that incorporating a small proportion of ethylene oxide in zein solutions retards the characteristic of those solutions to increase in viscosity, and therefore those solutions may be allowed to stand for from 4 to 10 days without any appreciable increase in viscosity. My invention is particularly applicable to solutions of zein in aqueous lower aliphatic ketones or aqueous monohydroxy lower aliphatic alcohols particularly where the ketone or alcohol constitutes 85–90% of the solvent. For example a mixture of 85 parts of acetone and 15 parts of water is an excellent solvent for zein forming a clear low viscosity solution or dope. The solution, however, will gel in about 48 hours without the presence of a stabilizing agent therein. Instead of a ketone, an alcohol such as methyl, ethyl, or isopropyl alcohol might be employed as the solvent for the zein and the same phenomenon occurs.

Ordinarily, it is only necessary to incorporate an amount of ethylene oxide in the solution 1–10% of the weight of the zein; usually a concentration of 2–5% will give the desired stability. It is desirable that at least 1% of ethylene oxide be incorporated in the solution. However, lesser amounts will give a proportional inhibiting effect therein.

The ethylene oxide may be incorporated in various ways in the zein solution. One method which has been found to be quite satisfactory is to bubble ethylene oxide into the solution of zein in aqueous solvent. Instead if desired, the ethylene oxide may be incorporated in one of the liquid constituents of the solution, and upon mixing of the zein and its solvent the ethylene oxide is also present. Best results are obtained by employing an elevated temperature such as at the time that the ethylene oxide is bubbled into the solution. For instance, the solution into which the ethylene oxide is bubbled may have a temperature up to 80° C., although temperatures within the range of 50–60° C. have been found to be quite useful in this connection. If desired, the solution may be treated with the ethylene oxide in an autoclave, in which operation a temperature within the range of 80–150° C. may be employed. Usually it is desirable to continue the heating for a time, such as up to 15 minutes, although in many cases continued heating has not been found to be necessary. If it is desired to use a temperature of 80° C. in the absence of an autoclave some other means may be employed to prevent the escape of solvent such as a refluxing operation.

This procedure has the advantage that there is an actual chemical reaction and no extraneous or residual material is introduced into the solution or dispersion. In this manner, any increase in viscosity or tendency to gel is reduced, or under the preferred conditions described, are completely eliminated for a reasonable period of time. As zein solutions are useful for various purposes but heretofore have evidenced the disadvantage of poor keeping qualities, my invention facilitates the usefulness of zein solutions.

The following examples illustrate my invention:

Example 1

A solution was prepared having the following composition:

| | |
|---|---|
| Acetone | cc__ 125 |
| Water | cc__ 35 |
| Zein | grams__ 50 |
| Ethylene oxide | do____ 2 |

The ethylene oxide was incorporated in the composition by bubbling it into the solution of the zein in the aqueous acetone which had been warmed to 60° C. This solution stood for 5 days without any appreciable increase in viscosity. A solution of the same composition omitting the ethylene oxide was found to gel in 24 hours.

Example 2

A solution was prepared as in the preceding example except that 5 grams of ethylene oxide was employed instead of 2 grams. The solution was autoclaved for 5 minutes at 120° C. The solution stood for 10 days without evidencing any change in viscosity.

Example 3

A solution was prepared having the following composition:

Ethyl alcohol (95% concentration) _____cc__ 90
Water _____cc__ 15
Zein _____grams__ 40

This solution was warmed to a temperature within the range of 50–60° C. and ethylene oxide was bubbled therein until 2 grams had been added. The solution stood for 10 days without evidencing any change in viscosity.

Example 4

A solution was prepared as in the preceding example except that 4 grams rather than 2 grams of ethylene oxide were added thereto. Upon standing for 16 days, the solution was still found to be a thin liquid dope.

Example 5

A solution was prepared having the following composition:

Acetone _____cc__ 125
Water _____cc__ 35
Zein _____grams__ 50

The solution was warmed to 50–60° C. and ethylene oxide was bubbled therein until an increase in weight of 5 grams was noted. The solution stood for 10 days without evidencing any change in viscosity.

Zein solutions, in accordance with my invention, may be mixed with plasticizers, pigments, dyes, filling materials, or colloidal materials which are added to improve or alter the characteristics of the solution. The solutions in accordance with my invention are adapted to the preparation of fibers or for coating surfaces therewith.

I claim:

1. A solution of zein in a solvent selected from the group consisting of aqueous acetone and the aqueous lower aliphatic alcohols containing therein 1 to 10% of ethylene oxide based on the weight of the zein.

2. A solution of zein in aqueous acetone containing therein 2–5% of ethylene oxide based on the weight of the zein.

3. A solution of zein in aqueous alcohol containing therein 2–5% of ethylene oxide based on the weight of the zein.

HUGH J. HAGEMEYER, Jr.